(12) United States Patent
Yen et al.

(10) Patent No.: US 6,918,564 B2
(45) Date of Patent: Jul. 19, 2005

(54) HEIGHT ADJUSTABLE APPARATUS FOR SUPPORTING FLAT MONITOR

(75) Inventors: Ching-Hui Yen, Shindian (TW); Chi-Jung Wu, Taoyuan (TW)

(73) Assignee: Benq Corporation, Taoyuan (TW)

( * ) Notice: Subject to any disclaimer, the term of this patent is extended or adjusted under 35 U.S.C. 154(b) by 0 days.

(21) Appl. No.: 10/456,204

(22) Filed: Jun. 6, 2003

(65) Prior Publication Data

US 2003/0234332 A1 Dec. 25, 2003

(30) Foreign Application Priority Data

Jun. 25, 2002 (TW) .................................. 91209549 U

(51) Int. Cl.[7] .............................................. F16M 11/00
(52) U.S. Cl. ............... 248/404; 248/123.11; 248/125.8; 248/917; 361/682
(58) Field of Search ................................ 248/404, 622, 248/624, 125.8, 407, 162.1; 361/682, 683

(56) References Cited

U.S. PATENT DOCUMENTS

| | | | | |
|---|---|---|---|---|
| 3,845,926 A | * | 11/1974 | Wahls ..................... 248/162.1 |
| 4,304,385 A | * | 12/1981 | Farouche et al. ........... 248/410 |
| 4,395,010 A | * | 7/1983 | Helgeland et al. .......... 248/371 |
| 4,605,188 A | * | 8/1986 | Goetz ......................... 248/157 |
| 4,690,362 A | * | 9/1987 | Helgeland ................... 248/404 |
| 5,751,548 A | * | 5/1998 | Hall et al. .................. 361/686 |
| 5,975,472 A | * | 11/1999 | Hung ........................ 248/278.1 |
| D427,163 S | * | 6/2000 | Bergeron Gull et al. ... D14/452 |
| 6,189,849 B1 | * | 2/2001 | Sweere et al. ............ 248/286.1 |
| 6,352,226 B1 | * | 3/2002 | Gordon ..................... 248/125.2 |
| 6,381,135 B1 | * | 4/2002 | Prasher et al. .............. 361/700 |
| 3,394,403 A1 | * | 5/2002 | Hung ....................... 248/276.1 |
| 6,478,275 B1 | * | 11/2002 | Huang ..................... 248/284.1 |
| 6,568,643 B2 | * | 5/2003 | Black ......................... 248/105 |
| 6,585,201 B1 | * | 7/2003 | Reed ........................ 248/181.1 |
| 6,609,686 B2 | * | 8/2003 | Malizia ................... 248/125.8 |
| 6,702,238 B1 | * | 3/2004 | Wang ...................... 248/125.8 |
| 6,712,321 B1 | * | 3/2004 | Su et al. ................. 248/123.11 |
| 2003/0075649 A1 | * | 4/2003 | Jeong et al. ................. 248/157 |

FOREIGN PATENT DOCUMENTS

| | | | |
|---|---|---|---|
| DE | 19855161 C1 | * | 2/2000 |
| EP | 965786 A1 | * | 12/1999 |
| GB | 2178950 A | * | 2/1987 |
| JP | 11202776 A | * | 7/1999 |

* cited by examiner

Primary Examiner—Anita M. King
(74) Attorney, Agent, or Firm—Snell & Wilmer L.L.P.

(57) ABSTRACT

A height-adjustable apparatus for supporting a flat monitor is disclosed. The height-adjustable apparatus includes a first support unit, an elastic element, and a second support unit. The first support unit has a first engaging device. One end of the elastic element is affixed on the first support unit. The second support unit, which is movably sleeved into the first support unit, has a second engaging device, a first end, and a second end. The first end touches the elastic element, and the second end connects the flat monitor. When the first engaging device and the second engaging device engage with each other, the height-adjustable apparatus has a first length. When the elastic element is extended with an external force, the second support unit slides to a position such that the apparatus has a second length. The first length is longer than the second length.

20 Claims, 7 Drawing Sheets

HEIGHT ADJUSTABLE APPARATUS FOR SUPPORTING FLAT MONITOR

CROSS REFERENCE TO RELATED APPLICATIONS

This application claims priority of Taiwan Patent Application Serial No. 091209549 entitled "Height Adjustable Apparatus for Supporting Flat Monitor", filed Jun. 25, 2002.

1. Field of Invention

The present invention relates to a support apparatus, and more particularly, to a support apparatus for height-adjustably supporting a display device.

2. Background of the Invention

Flat monitors, e.g. liquid crystal display (LCD) monitors, have gradually replaced the conventional cathode ray tube (CRT) monitors because flat monitors have excellent display quality and are thinner and lighter than CRT monitors. Furthermore, some of advanced LCD monitors are designed to have portrait and landscape display functions. Accordingly, the support apparatus designed for supporting conventional CRT monitors are not suitable for the LCD monitors nowadays. Therefore, the support apparatus for height-adjustably supporting monitors come into fashion.

The conventional height-adjustable support apparatus can be classified into two categories. One is hydraulic-type support apparatus, and the other is spring-type support apparatus. The hydraulic-type support apparatus utilizes the hydraulic force to balance the weight of the monitor and frictional forces between components in order to adjust the height of the monitor. Because of high costs of the hydraulic-type support apparatus, however, it is not an optimal choice for general users.

The conventional spring-type support apparatus has a few of components, such as a bearing for affixing a constant force spring on a main body, rollers and grooves for adjusting height, and a pad for preventing frictions between metal components. Therefore, plural components, on one hand, increase the assembling costs of the spring-type support apparatus and, on the other hand, decrease the usable space for the disposal of wires or cables.

To solve the problems described above, it is a desire to provide a height-adjustable support apparatus with reduced number of components, lower assembling costs, and easy arrangement of cables.

SUMMARY OF THE INVENTION

It is one aspect of the present invention to provide a support apparatus, which utilizes the force provided by a constant force spring, weight of a monitor, and friction between components to adjust height of the support apparatus.

It is another aspect of the present invention to provide a height-adjustable support apparatus, which can be efficiently height-adjusted through the cooperation between an elastic element and two support units sleeved with each other.

It is a further aspect of the present invention to provide a height-adjustable support apparatus with a cable-routing mechanism. A groove within the support unit is provided for accommodating the cable and a roller is provided to guide movement of the cable while adjusting the height of the support apparatus.

The present invention discloses a support apparatus for height-adjustably supporting a display device. The support apparatus includes a first support unit, an elastic element, and a second support unit. The first support unit has a first engaging device. The elastic element has one end being affixed on the first support element. The second support unit is movably sleeved into the first support unit. The second support unit includes a second engaging device, a first end, and a second end. The first end touches against the elastic element and the second end is connected to the display device. The support apparatus has a first length when the first engaging device of the first support unit engages with the second engaging device of the second support unit. The second support unit moves to a predetermined position making the support apparatus have a second length when an external force is exerted on the elastic element. The first length is larger than the second length.

The support apparatus further includes a housing, which accommodates the first support unit, second support unit, and the elastic element. Furthermore, the support apparatus includes a base on which the first support unit is affixed.

DETAILED DESCRIPTION

The present invention discloses a support apparatus for height-adjustably supporting a display device, e.g. a flat monitor or a LCD monitor. These and other features and advantages of the present invention will become more apparent and completed from the following detailed description and the appended drawings from FIG. 1 to FIG. 6.

Figure 1:
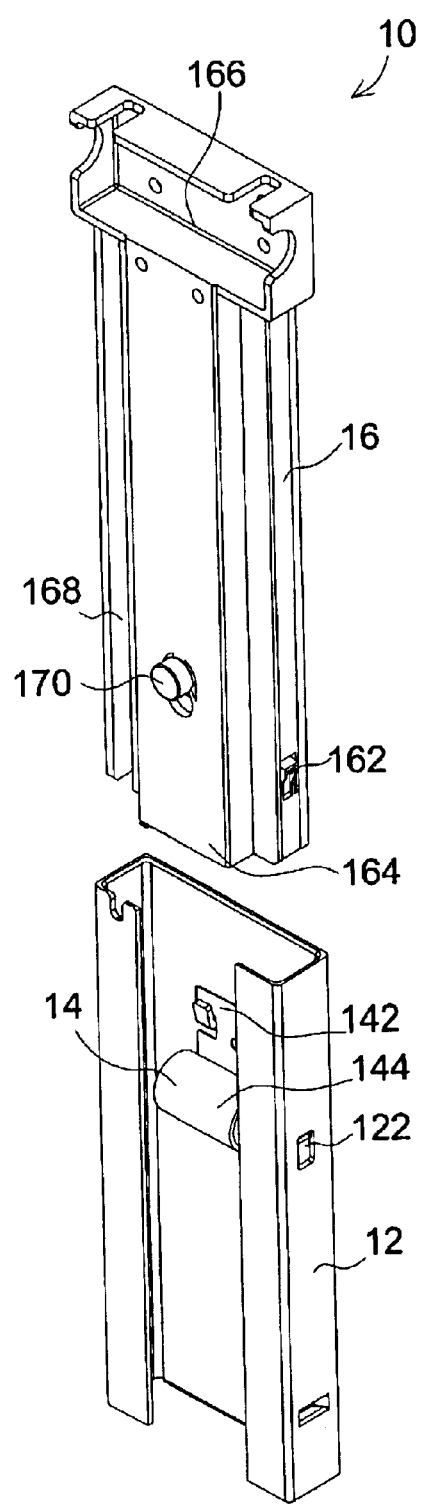
FIG. 1 is a perspective view of components of the support apparatus in one embodiment of the present invention.

As shown in FIG. 1, in one embodiment of the present invention, a support apparatus 10 includes a first support unit 12, an elastic element 14, and a second support unit 16. The first support unit 12 has a first engaging device 122, e.g. a slot. The elastic element 14, such as a constant force spring, has one end 142 being affixed on the first support unit 12 by utilizing a hook. The second support unit 16 is movably sleeved into the first support unit 12. The second support unit 16 has a second engaging device 162, e.g. a latch, a first end 164, and a second end 166. The first end 164 touches against the elastic element 14 and the second end 166 is connected to the display device (not shown in FIG. 1).

Figure 2:
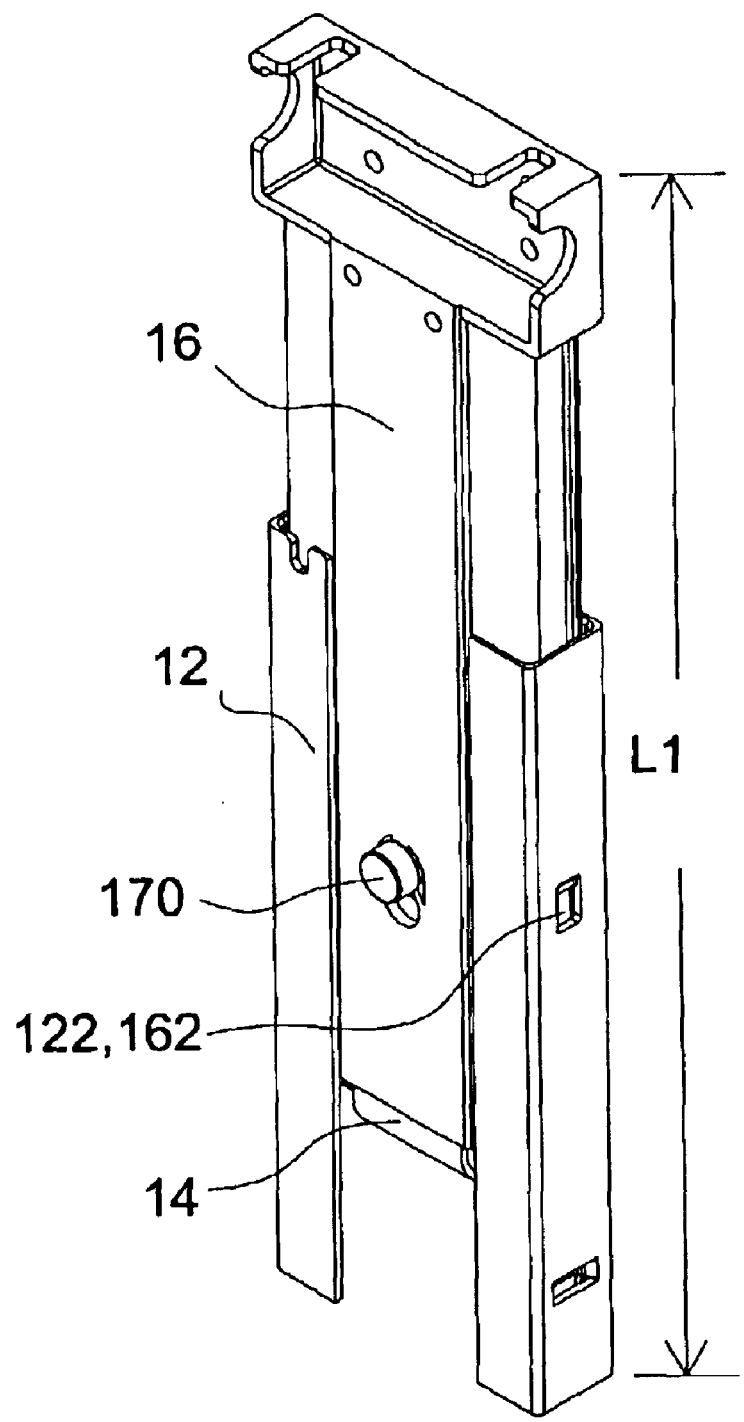
FIG. 2 is a perspective view of the support apparatus having a first length when the engaging devices engage with each other.

As shown in FIG. 2, the support apparatus 10 has a first length (L1) when the second engaging device 162 of the second support unit 16 engages with the first engaging device 122 of the first support unit 12. The first length represents a maximum length to which the support apparatus 10 can be adjusted. Therefore, the position of the first engaging device 122 determines the maximum height of the support apparatus 10. It is noted that the end 142 of the elastic element 14 is affixed on the first support unit 12 with respect to the position of the first engaging device 122. In other words, the end 142 of the elastic element 14 is affixed on a predetermined position so that when the second engaging device 162 engages with the first engaging device 122, the body 144 of the elastic element 14, which touches against the first end 164 of the second support unit 16, extends to a predetermined length. The predetermined length is in a length region, such as region "A" shown in FIG. 6, where the elastic element 14 provides a constant force.

Figure 3:
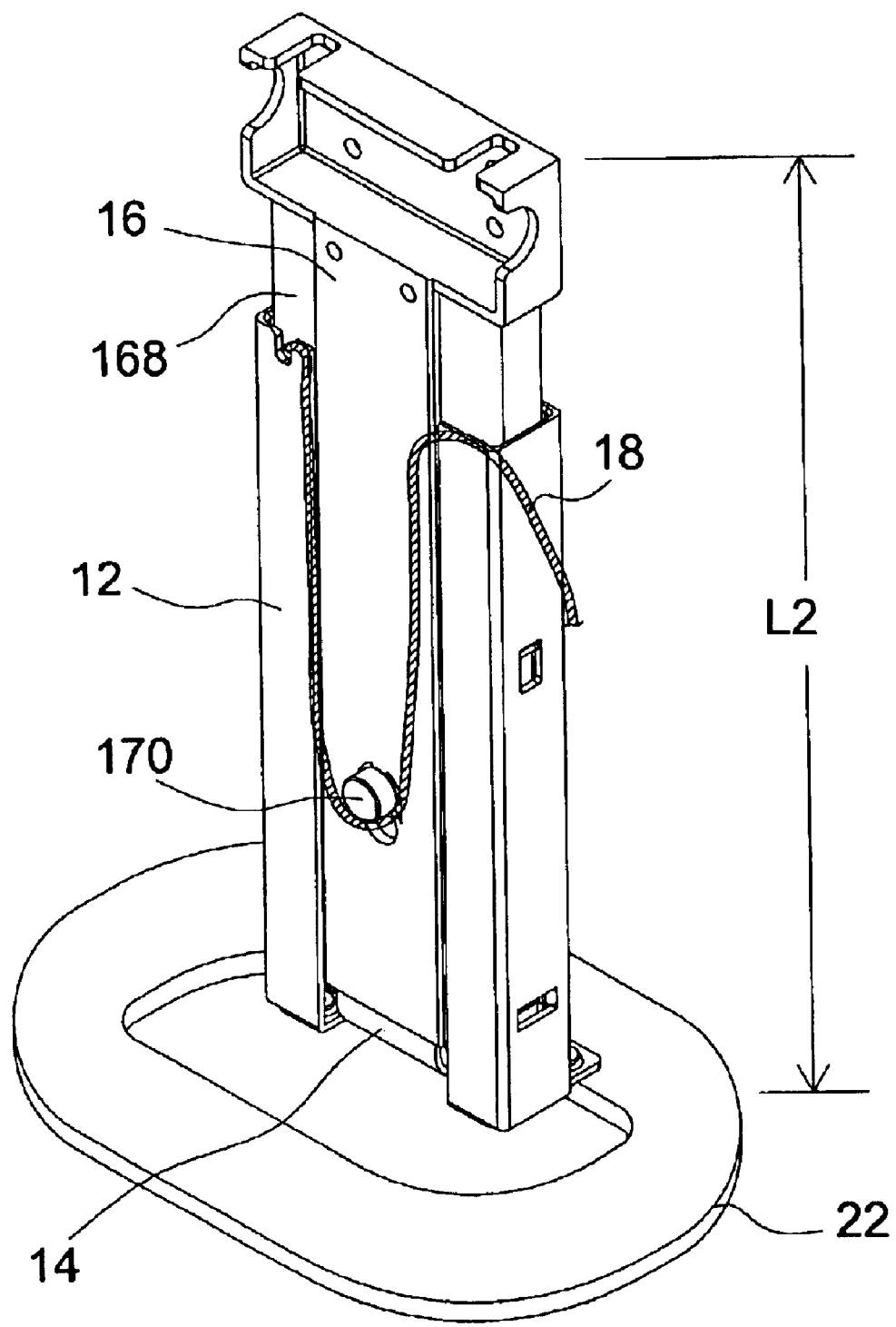
FIG. 3 is a perspective view of the support apparatus exhibiting a second length.

As shown in the FIG. 3, the second support unit 16 moves along the first support unit 12 to a predetermined position making the support apparatus 10 have a second length (L2) when an external force is exerted on the elastic element 14 and the first engaging device 122 is disengaged from the second engaging device 162. The first length is larger than the second length. The display device can reach a stable state during the height-adjusting process due to the force provided by the elastic element 14, weight of the display device (not shown in figures), and friction between components. In other words, the support apparatus 10 descends from the level of the first engaging device 122 to another level in accordance with the magnitude of the external force. Accordingly, when another external force is exerted on the elastic element 14 in the opposite direction, the support apparatus 10 ascends from the descended position in accordance with the magnitude of the external force until the first engaging device 122 re-engages with the second engaging device 162.

Figure 4:
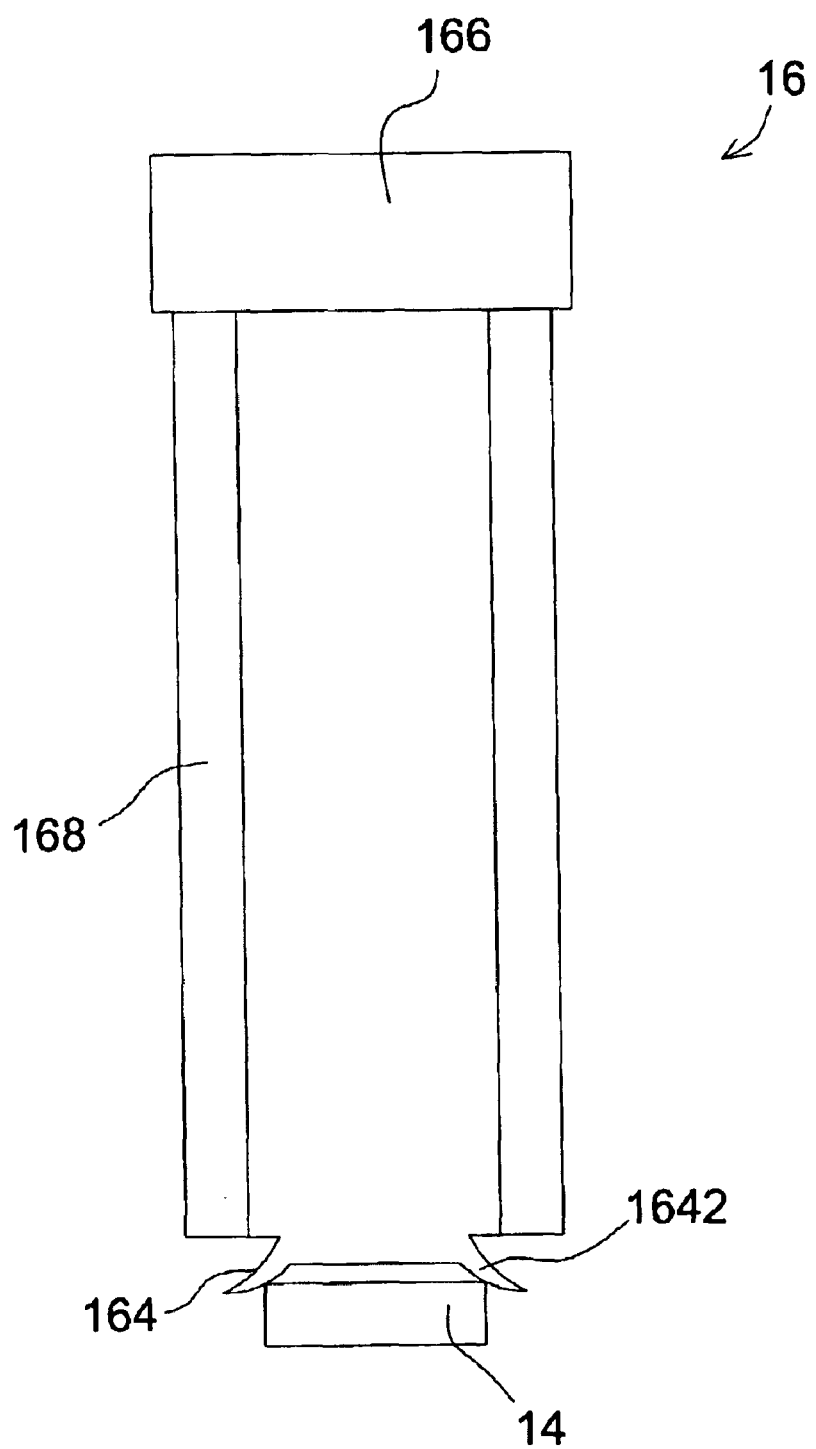
FIG. 4 is a front view of the second support unit having a sloped surface on the first end.

FIG. 4 is a front view of the second support unit 16 of the support apparatus 10 in another embodiment of the present invention. The first end 164 of the second support unit 16 further includes a sloped surface 1642, which touches against the elastic element 14. Therefore, the first end 164 of the second support unit 16 is an outwardly extended shape for accommodating the body 144 of the elastic element 14, which makes the external force be more uniformly exerted on the elastic element 14. Accordingly, the second support unit 16 serves functions of both as a sliding rail, with respect to the first support unit 12, and an actuator actuating and accommodating a portion of the elastic element 14.

As shown in FIG. 3, the second support unit 16 further includes a groove 168 for accommodating a cable 18, which can be connected to the display device as appropriate. When the second support unit 16 is sleeved into the first support unit 12, the cable 18 can be bundled together into the groove 168 along a longitudinal direction of the first support unit 12. In addition, the second support unit 16 further includes a roller 170, which is configured to guide movement of the cable 18 when the second support unit 16 moves to the predetermined position (i.e. the descended position when an external force is provided).

Figure 5:
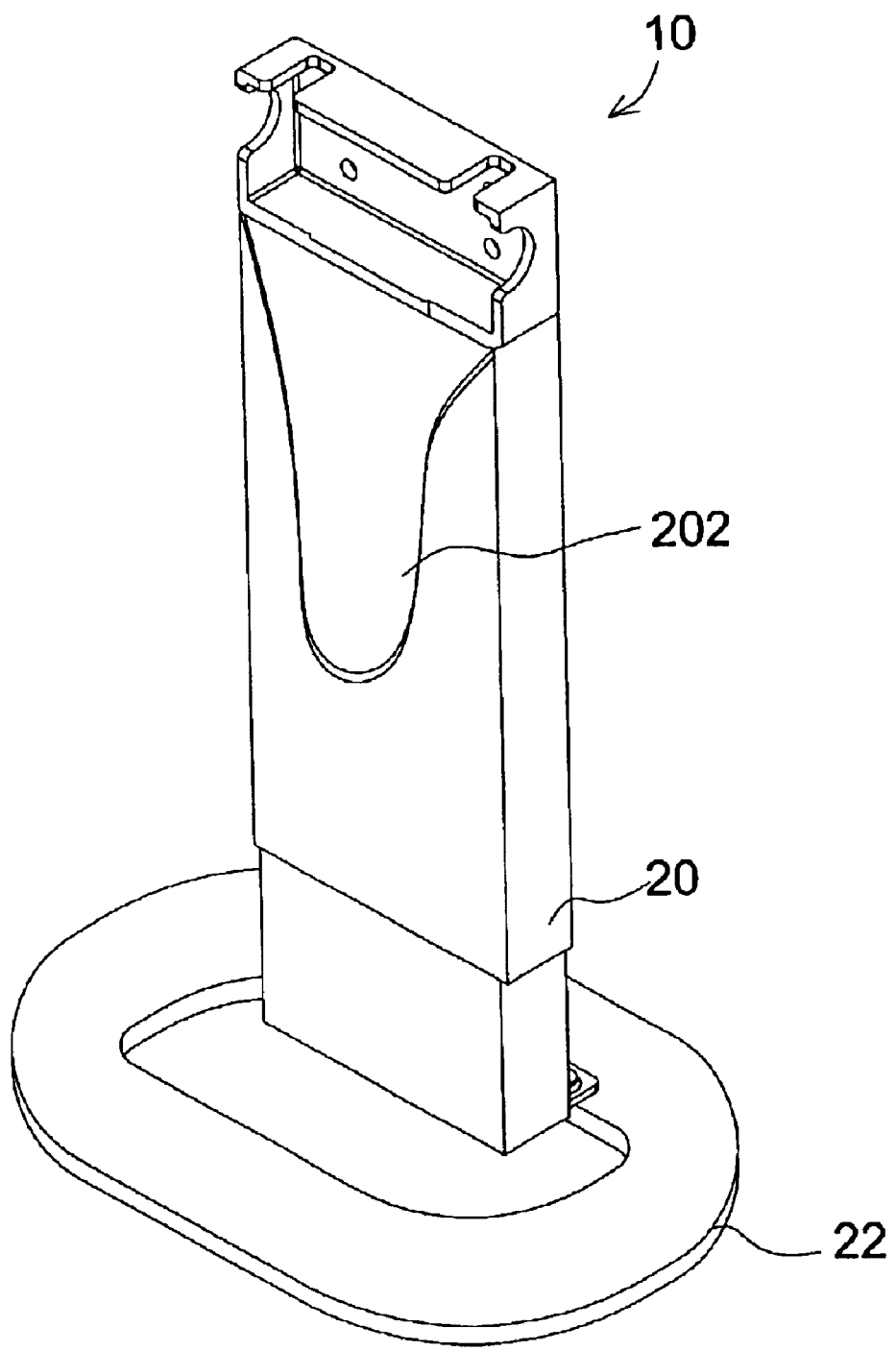
FIG. 5 is a perspective view of the support apparatus having a housing and a base.
Figure 6:
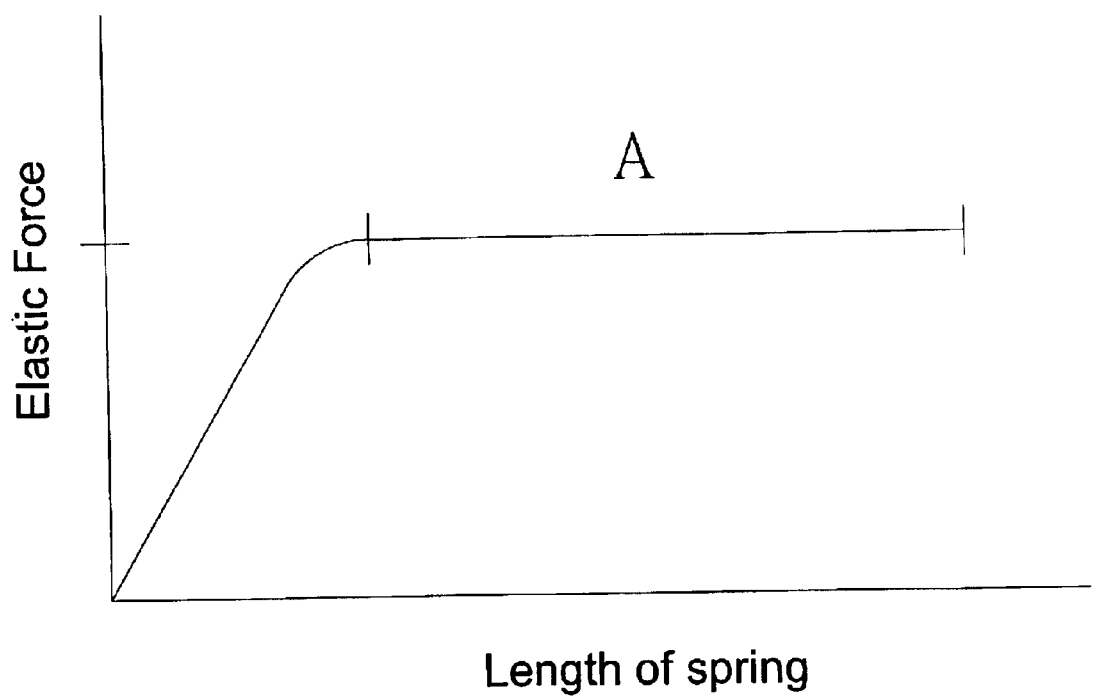
FIG. 6 is a diagram illustrating the relationship between the elastic force and the length of the elastic element.
Figure 7:
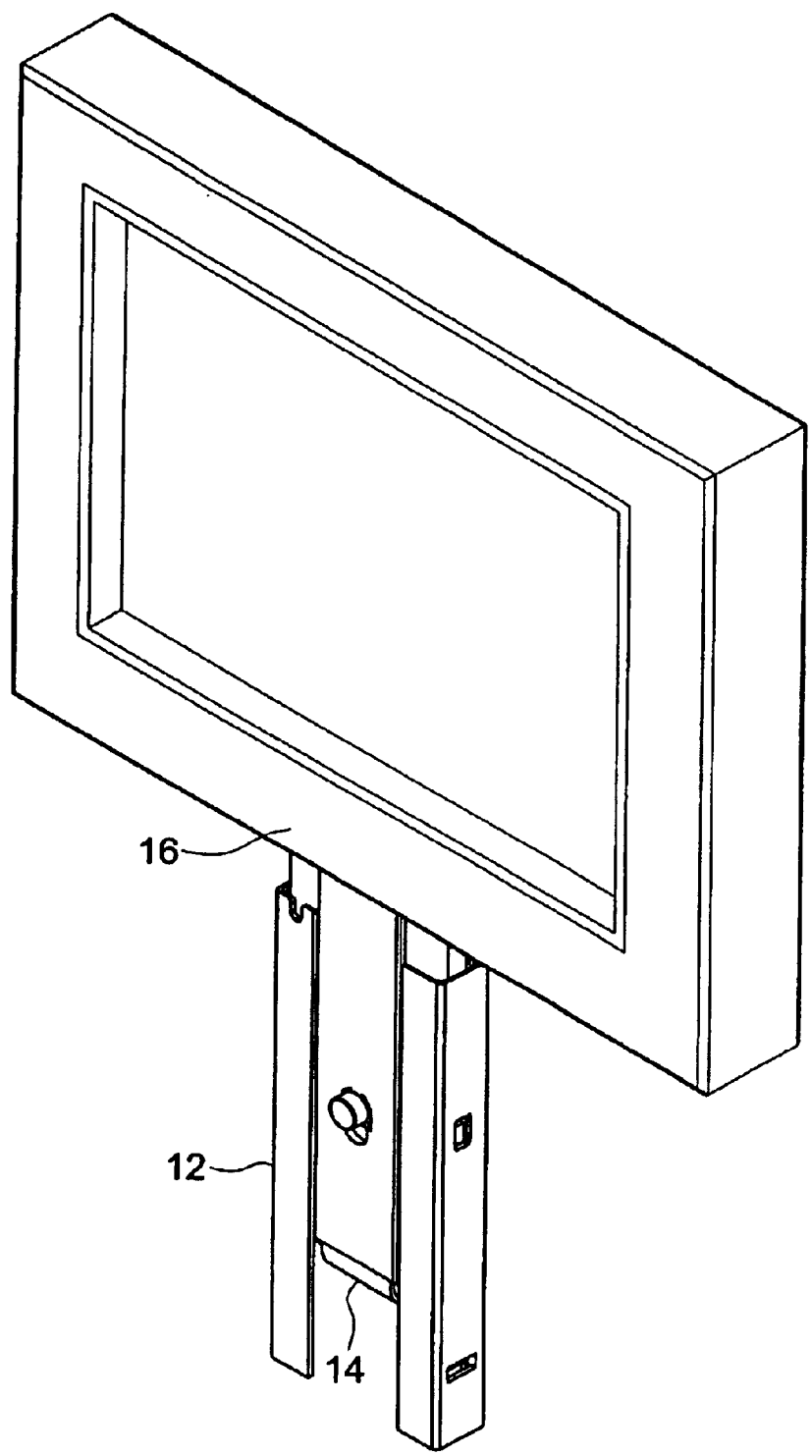
FIG. 7 is a perspective view of an article of manufacture having a display device and a support apparatus.

Furthermore, as shown in FIG. 3 and FIG. 5, the support apparatus 10 further includes a base 22. The first support unit 12 is affixed on the base 22 to further strengthen the support and affixation performance of the support apparatus 10. It is noted that the base 22 is not limited to the rectangular shape as illustrated in the embodiment. In addition, the support apparatus 10 further includes a housing 20 for accommodating the first support unit 12, the second support unit 16 and the elastic element 14. The housing 20 is extendible (or height-adjustable) to achieve the height-adjustable feature of the support apparatus 10. The housing 20 is similar to that of prior art housings and is not elaborated here. It is noted that the housing 10 includes an accommodation part 202 corresponding to the moving path of the cable 18 so as to improve the arrangement of the cable 18.

Furthermore, the first engaging device 122 and the second engaging device 162 described above are respectively as a slot and a latch, however, they are interchangeable in practice. For example, the first engaging device 122 and the second engaging device 162 can be respectively a latch and a slot. Moreover, the engaging devices 122 and 162 can be any other devices being able to engage with each other. Similarly, the end 142 of the elastic element 14 is described as being affixed on the first support unit 12 by utilizing a hook, however, it can also be affixed by any other arrangements, which can steadily couple the end 142 to the first support unit 12.

The above description only sets forth preferred embodiment of the invention, and is not intended to limit the scope, applicability, or configuration of the invention in any way. Rather, various changes may be made in the function and arrangement of the elements described in the embodiment without departing from the spirit and scope of the invention. Thus, the protected scope of the present invention is as set forth in the appended claims.

What is claimed is:

1. A support apparatus for height-adjustably supporting a display device, comprising:

a first support unit having a first engaging device;

a constant force spring having one end affixed on said first support unit; and a second support unit being movably received in said first support unit, the second support unit comprising a second engaging device, a first end, and a second end, the first end touching against said constant force spring and the second end adapted to be connected to said display device;

wherein said support apparatus exhibits a first length when said second engaging device of the second support unit engages with said first engaging device of the first support unit, and said second support unit moves to a predetermined position making said support apparatus exhibits a second length when an external force is exerted on said constant force spring, and wherein the first length is larger than the second length; and wherein said constant force spring provides a constant force to balance the weight of display device and friction within the support apparatus when said support apparatus exhibits a length between the first length and the second length.

2. The support apparatus of claim 1, wherein said second support unit further comprises a groove for accommodating a cable of said display device.

3. The support apparatus of claim 2, wherein said second support unit further comprises a roller for guiding movement of said cable of the display device as said second support unit moves to said predetermined position.

4. The support apparatus of claim 1, further comprising a housing for accommodating said first support unit, said second support unit, and said constant force spring.

5. The support apparatus of claim 1, further comprising a base, wherein said first support unit is affixed on said base.

6. The support apparatus of claim 1, wherein said first end of the second support unit further comprises a sloped surface touching against said constant force spring.

7. The support apparatus of claim 1, wherein said first engaging device is a slot and said second engaging device is a latch.

8. The support apparatus of claim 1, wherein said first engaging device is a latch and said second engaging device is a slot.

9. A support apparatus for height-adjustably supporting a flat display device, comprising:

a base;

a first support unit being affixed on said base, the first support unit having a first engaging device;

an elastic element having one end affixed on said first support unit;

a second support unit movably received in said first support unit, the second support unit comprising a second engaging device, a groove, a first end, and a second end, the groove accommodating a cable of said flat display device, the first end touching against said elastic element and the second end adapted to be connected to said flat display device; and a roller disposed on said second support unit;

wherein said support apparatus exhibits a first length as said second engaging device of the second support unit engages with said first engaging device of the first support unit, and said second support unit moves to a predetermined position making said support apparatus exhibits a second lengths when an external force is exerted on said elastic element, and wherein the first length is larger than the second length and said roller guides movement of said cable.

10. The support apparatus of claim 9, further comprising a housing for accommodating said first support unit, said second support unit, and said elastic element.

11. The support apparatus of claim 9, wherein said first end of the second support unit comprises a sloped surface touching against said elastic element.

12. The support apparatus of claim 9, wherein said elastic element comprises a constant force spring.

13. The support apparatus of claim 9, wherein said first engaging device is a slot and said second engaging device is a latch.

14. The support apparatus of claim 9, wherein said first engaging device is a latch and said second engaging device is a slot.

15. An article of manufacture, comprising:

a display device; and a support apparatus, having:

a first support unit having a first engaging device;

a constant force spring having one end affixed on said first support unit; and a second support unit being movably received in said first support unit, the second support unit comprising a second engaging device, a first end, and a second end, the first end touching against said constant force spring and the second end adapted to be connected to said display device;

wherein said support apparatus exhibit a first length when said second engaging device of the second support unit engages with said first engaging device of the first support unit, and said second support unit moves to a predetermined position making said support apparatus exhibit a second length when an external force is exerted on said constant spring force, and wherein the first length is larger than the second length;

wherein said constant force spring provides a constant force to balance the weight of display device and friction within the support apparatus when said support apparatus exhibit a length between the first length and the second length.

16. The article of claim 15, wherein said second support unit further comprises a groove for accommodating a cable of said display device.

17. The article of claim 16, wherein said second support unit further comprises a roller for guiding movement of said cable of the display device as said second support unit moves to said predetermined position.

18. The article of claim 15, further comprising a housing for accommodating said first support unit, said second support unit, and said constant force spring.

19. The article of claim 15, further comprising a base, and wherein said first support unit is affixed on said base.

20. The article of claim 15, wherein said first end of the second support unit further comprises a sloped surface touching against said constant force spring.

* * * * *